United States Patent Office.

ALEXANDER KIRKWOOD, OF TORONTO, CANADA.

Letters Patent No. 113,063, dated March 28, 1871.

IMPROVEMENT IN MEAT-BISCUITS.

The Schedule referred to in these Letters Patent and making part of the same.

Be it known that I, ALEXANDER KIRKWOOD, of the city of Toronto, in the county of York, province of Ontario, Dominion of Canada, gentleman, have invented a new, useful, and vendible composition of matter, to be called "Kirkwood's Meat or Soup-Biscuit;" and the following is an exact specification thereof.

The invention consists in comminuting fresh unboiled beef, fat and lean together, and kneading thoroughly therewith finely-ground pease and bean-meal, mechanically, without water or other liquid, and without heat, in the proportion of about equal weights of meal and meat.

This composition is rolled or pressed and cut of any size or form, and dried at a temperature below 140° Fahrenheit.

I do not claim the use of any extract of meat, or of any condiment, or of any acid, or of any carbonaceous material to preserve my biscuit, or as an antiseptic; but

I claim as my invention—

The composition of matter, as and for the purpose above set forth.

ALEXANDER KIRKWOOD.

Witnesses:
   J. O. GRAY,
   JOHN LEYS.